(12) United States Patent
Kreutzer et al.

(10) Patent No.: US 9,206,081 B2
(45) Date of Patent: Dec. 8, 2015

(54) BULK MORTAR SYSTEM

(75) Inventors: Charles Kreutzer, Springfield, IL (US);
Mark T. Arisman, Springfield, IL (US);
Mike Daw, Forsyth, IL (US)

(73) Assignee: Solomon Colors, Inc., Springfield, IL (US)

( * ) Notice: Subject to any disclaimer, the term of this patent is extended or adjusted under 35 U.S.C. 154(b) by 1232 days.

(21) Appl. No.: 12/336,067

(22) Filed: Dec. 16, 2008

(65) Prior Publication Data
US 2010/0147880 A1   Jun. 17, 2010

(51) Int. Cl.
*B65B 1/32* (2006.01)
*C04B 14/30* (2006.01)
*C04B 103/54* (2006.01)

(52) U.S. Cl.
CPC .............. *C04B 14/30* (2013.01); *C04B 2103/54* (2013.01)

(58) Field of Classification Search
CPC ....... G01G 11/08; G01G 19/22; B65G 47/00; B65G 2811/0673; C04B 2103/54; B65B 1/06; B65B 1/08; B65B 1/32
USPC ........ 222/132, 55, 56, 561, 129, 135; 366/21; 366/18; 177/70
See application file for complete search history.

(56) References Cited

U.S. PATENT DOCUMENTS

| | | | |
|---|---|---|---|
| 2,863,651 A | 12/1958 | McBride | |
| 2,530,501 A | 9/1959 | Avril | |
| 3,638,922 A * | 2/1972 | Guglietti | 366/21 |
| 3,670,923 A | 6/1972 | Hawes, Jr. et al. | |
| 4,100,984 A * | 7/1978 | Klopfenstein et al. | 177/50 |
| 4,158,427 A | 6/1979 | Hegge | |
| 4,222,448 A * | 9/1980 | Sunkle et al. | 177/1 |
| 4,247,019 A | 1/1981 | Lerner | |
| 4,402,643 A | 9/1983 | Lytton et al. | |
| 4,528,848 A | 7/1985 | Hafner | |
| 4,581,704 A | 4/1986 | Mitsukawa | |
| 4,889,433 A | 12/1989 | Pratt | |
| 4,953,752 A | 9/1990 | Tousignant et al. | |
| 5,087,128 A | 2/1992 | Matthews et al. | |
| 5,270,495 A | 12/1993 | Mosher et al. | |
| 5,341,307 A * | 8/1994 | Myhre et al. | 700/240 |
| 5,413,154 A * | 5/1995 | Hurst et al. | 141/83 |
| 5,415,323 A | 5/1995 | Fenelon | |

(Continued)

OTHER PUBLICATIONS

Advanced Concrete Technologies, Automatic Color Metering Systems for C-Pigment and G-Granule, Wurschum, 2002/2004 (12 pages).

(Continued)

*Primary Examiner* — Kevin P Shaver
*Assistant Examiner* — Robert Nichols, II
(74) *Attorney, Agent, or Firm* — Polsinelli PC (57) ABSTRACT

A system and apparatus for preparing bulk quantities of dry colorant or pigment for blending with mortar are described. The system mixes the three primary pigments of black, red and yellow to prepare a batch of the dry colorant having a particular color. The pigments or dry colorant are generally a powder of metal oxide crystals. The system includes pigment dispensers, wherein each pigment dispenser includes a tote that is in flowing communication with a slider valve. The slider valve is in flowing communication with a transition piece, and the transition piece is in flowing communication with a vibratory tray having an exit opening. A receptacle receives pigments from the exit opening of the vibratory trays. A control unit serially operates the vibratory trays to dispense the pigment from each tote. A scale measures the weight of the pigments in the receptacle.

10 Claims, 6 Drawing Sheets

(56) References Cited

U.S. PATENT DOCUMENTS

| | | | |
|---|---|---|---|
| 5,487,603 A | | 1/1996 | Hoff et al. |
| 5,767,455 A | | 6/1998 | Mosher |
| 6,007,236 A | * | 12/1999 | Maguire ................. 366/141 |
| 6,098,847 A | | 8/2000 | Vollmar |
| 6,098,851 A | * | 8/2000 | Anderson ............... 222/185.1 |
| 6,811,301 B2 | * | 11/2004 | Packard ................. 366/141 |
| 6,823,904 B2 | * | 11/2004 | Finke et al. ............... 141/61 |
| 8,683,920 B1 | * | 4/2014 | Oropeza ................. 100/229 A |
| 2003/0227814 A1 | * | 12/2003 | Priesnitz et al. ................ 366/2 |
| 2004/0016378 A1 | * | 1/2004 | Powell et al. ............... 111/200 |
| 2007/0137317 A1 | * | 6/2007 | Brone et al. ............. 73/863.54 |
| 2007/0144403 A1 | * | 6/2007 | Fenelon .................... 106/437 |

OTHER PUBLICATIONS

Advanced Concrete Technologies, Powder Metering System, Wurschum, 2003 (8 pages).

http://www.daviscolors.com/products/granufin/Granumat.html, Granumate Metering Equipment, Sep. 7, 2007 (2 pages).

Davis Colors, Concrete Colors, 1997, (1 page).

Concrete Products, More to Color than meets the eye, Bayer Polymers and Chemicals Devisions, Jan. 1, 2001 (4 pages).

Concrete Products, Coloring Systems, Powder, liquid or granules? A method that's right for every producer, N. Paris and M. Chusid, Jan. 1998 (5 pages).

http://standleybatch.com/, Standley Batch Systems, Inc., Sep. 2007 (2 pages).

http://www.kfbatch.com/materialhandling.htm, Sep. 2007 (5 pages).

U.S. Appl. No. 12/639,571; Office Action mailed Feb. 14, 2013; (12 pages).

Aerogran, Eagle Engineering, Alpena, Michigan, Apr. 2000 (4 pages).

U.S. Appl. No. 12/639,571; Office Action issued Aug. 30, 2013; (12 pages).

Chameleon Concrete Color Systems brochure; Sep. 10, 2007 (4 pages).

U.S. Appl. No. 12/639,571; Office Action issued Mar. 31, 2014; (13 pages).

U.S. Appl. No. 12/639,571; Notice of Allowance issued Feb. 13, 2015 (8 pages).

\* cited by examiner

BULK MORTAR SYSTEM

FIELD OF THE INVENTION

The present invention relates to a system and apparatus for preparing bulk quantities of dry colorant for blending with mortar.

BACKGROUND OF THE INVENTION

Prior art methods of preparing batches of dry colorant include manually measuring and mixing the batch of colorant from three different bags or containers each containing one of the primary colors of pigment. This is a labor-intensive process prone to human error during the measuring and mixing. The prior art process may also result in workplace injury, as bulk colorant is provided in large, heavy amounts. Others have attempted to maintain an inventory of pre-batched colors. This requires the user to maintain a large inventory of batched colorants, if the customer desires to have the different colored colorants immediately in stock.

Dry colorant is difficult to handle and/or transfer, as it tends to clump and stick together forming cakes and lumps. The dry colorant will coat and adhere to packaging and handling equipment. The dry colorant often forms "bridges" in the prior art handling apparatus and systems that clog the apparatus with dry colorant resulting in a loss in production.

As such, dry colorant is often processed into a granule that has improved transfer and handling characteristics as compared to the dry colorant. The granules generally comprise encapsulated dry pigments. The granules have a much larger size than the dry pigments and often tend to have a roughly spherical shape. The granules also have a more consistent and uniform shape. These features of granules improve their transfer and handling characteristics.

The granules may be produced by forming a slurry of the dry colorant with a binder. The slurry is then spray dried to form the granule. The binder may include a ligand based binder. The granules may also be produced using a compacting method, where the dry colorant is dampened with water and then compacted with the binder in a compacting machine.

The individual granules have a much larger size than the individual dry colorant particles. The granules typically have a size of hundreds of micrometers or larger. Unfortunately, granules of dry powder are not suitable for mortar applications since the granules do not break down or disperse sufficiently during the mixing of the mortar, and the resulting mortar will have streaks and other undesirable areas of highly-concentrated color. These streaks and areas may be unacceptable for certain applications. As such, mortar generally requires the use of the dry powder, and not granules, in order to color the mortar.

SUMMARY OF INVENTION

A system and apparatus for preparing bulk quantities of dry colorant for blending with mortar are described. The system mixes the three primary pigments of black, red and yellow to prepare a batch of the dry colorant having a particular color. The pigments or dry colorant are generally a powder of metal oxide crystals.

The dry colorant is suitable for use in coloring mortar. During the preparation of the mortar, the constituent components, including the dry colorant are mixed to form the colored mortar. The mortar may include a combination of water, coarse and fine aggregates and cement. Mortar preparation does not typically involve grinders, mechanical mixing, or sufficient agitation that would break down, disperse or distribute granules of dry colorant in order to provide a generally uniform color to the mortar. As such, the use of dry colorant in preparing mortar, as opposed to granulated colorant, is necessary to avoid streaking of color in the finished mortar.

In one embodiment, the system includes a plurality of pigment dispensers. Each pigment dispenser includes a tote to hold pigments. The tote is in flowing communication with a slider valve. The slider valve is in flowing communication with a transition piece. The transition piece is in flowing communication with a vibratory tray having an exit opening. A receptacle receives the pigments from the exit opening of the vibratory trays. A control unit serially operates the vibratory trays to dispense the pigment from each tote. A scale measures the weight of the pigments in the receptacle. The scale is in operational communication with the control unit.

In another embodiment, a method of producing a batch of dry pigment is described. The method includes providing a plurality of pigment dispensers, wherein each pigment dispenser includes a tote containing pigments, the tote in flowing communication with a slider valve, the slider valve in flowing communication with a transition piece, and the transition piece in flowing communication with a vibratory tray having an exit opening. The method further includes providing a receptacle to receive pigments from the exit opening of the vibratory trays and providing a control unit to serially operate the vibratory trays to dispense the pigment from each tote. The method further includes providing a scale to measure the weight of the pigments in the receptacle, wherein the scale is in operational communication with the control unit. The method includes dispensing pigments from each pigment dispenser to produce the batch of the dry pigment.

DETAILED DESCRIPTION OF EMBODIMENTS

A system and apparatus for preparing bulk quantities of dry colorant for blending with mortar is described. The system mixes the three primary pigments of black, red and yellow to prepare a batch of the dry colorant having a particular color. Virtually all colors needed for the concrete industry may be made from mixing portions of the black, red and yellow pigments.

The system comprises automated processes to dispense a certain amount of the three primary pigments in order to form a batch of the dry colorant having the particular color. The system maintains a database of formulas for different colored dry colorants. The user inputs a color selection into the system, and the system automatically produces the dry colorant with the selected color. No manual dispensing or measuring of the pigment is required.

The pigments or dry colorant generally comprise finely milled mineral oxide pigments in the form of a dry powder.

Synthetic iron oxides are often used for the pigments. Suitable dry colorants are commercially available from Solomon Colors, Inc. of Springfield, Ill. under the SGS INTEGRAL COLORS™ brand. The iron oxide crystals generally have an irregular and non-uniform shape, which require the transfer methods and systems described herein. The shape of the iron oxide crystals may vary between cubical, acicular, spherical and variations thereof resulting from grinding and processing. The iron oxide crystals are sticky and abrasive. Certain iron oxide crystals will exhibit magnetic attraction. These features of the iron oxide crystals make them difficult to transfer and move through an automated system.

Different colored iron oxide crystals exhibit different physical and structural properties resulting in different flow and transfer characteristics for the different colored iron oxide crystals. As such, some of the systems and methods described herein are customized to the particular iron oxide crystal. The yellow iron oxides may have the general formula of $Fe_2O_3$—$H_2O$, while the black iron oxides may have the general formula of $FeO$—$Fe_2O_3$, and the red iron oxides may have the general formula of $Fe_2O_3$. Depending upon the particular color of pigment, the pigments may have fineness range of from approximately 95% to approximately 99% of a minus 325 mesh sieve. The iron oxides have a particle size of approximately 5 micrometers to approximately 75 micrometers with a preferred size of less than 44 micrometers. The iron oxides forming the powder are thus much smaller than the granulated particles of iron oxide pigment which are generally of a minus 30 mesh sieve. The iron oxides crystals are further described in U.S. Pat. No. 5,900,051 assigned to Solomon Colors, Inc., the disclosure of which is hereby incorporated by reference.

A system 10 for mixing batches of colorant is shown in FIGS. 1-11. The system 10 described herein allows the user to maintain supplies of the three primary colored pigments, i.e., black, yellow, and red, in stock and avoids the need for the user to maintain large amounts of batched colorant on hand, as the batch of the specific colorant is made on demand. As such, the inventory necessary to batch the different colorants is reduced. Moreover, a nearly limitless variety of colors may be produced on demand.

The system 10 provides on-demand batches of concrete pigments comprising two or more different types of pigments at the tolerance of ±0.05 pounds. The system 10 includes a database of different colors of pigment for selection by the user.

The system 10 precisely weighs and measures the portions of each of the three primary pigments needed to prepare a batch of colorant having a particular color. Portions of at least two of the three primary pigments are combined to form the batch having a particular color. A formula for the particular color is stored in the system 10. The formula is based on weight amounts of the different pigments needed to make the particular color. The formula is one of many formulas stored in the system 10.

Figure 1:
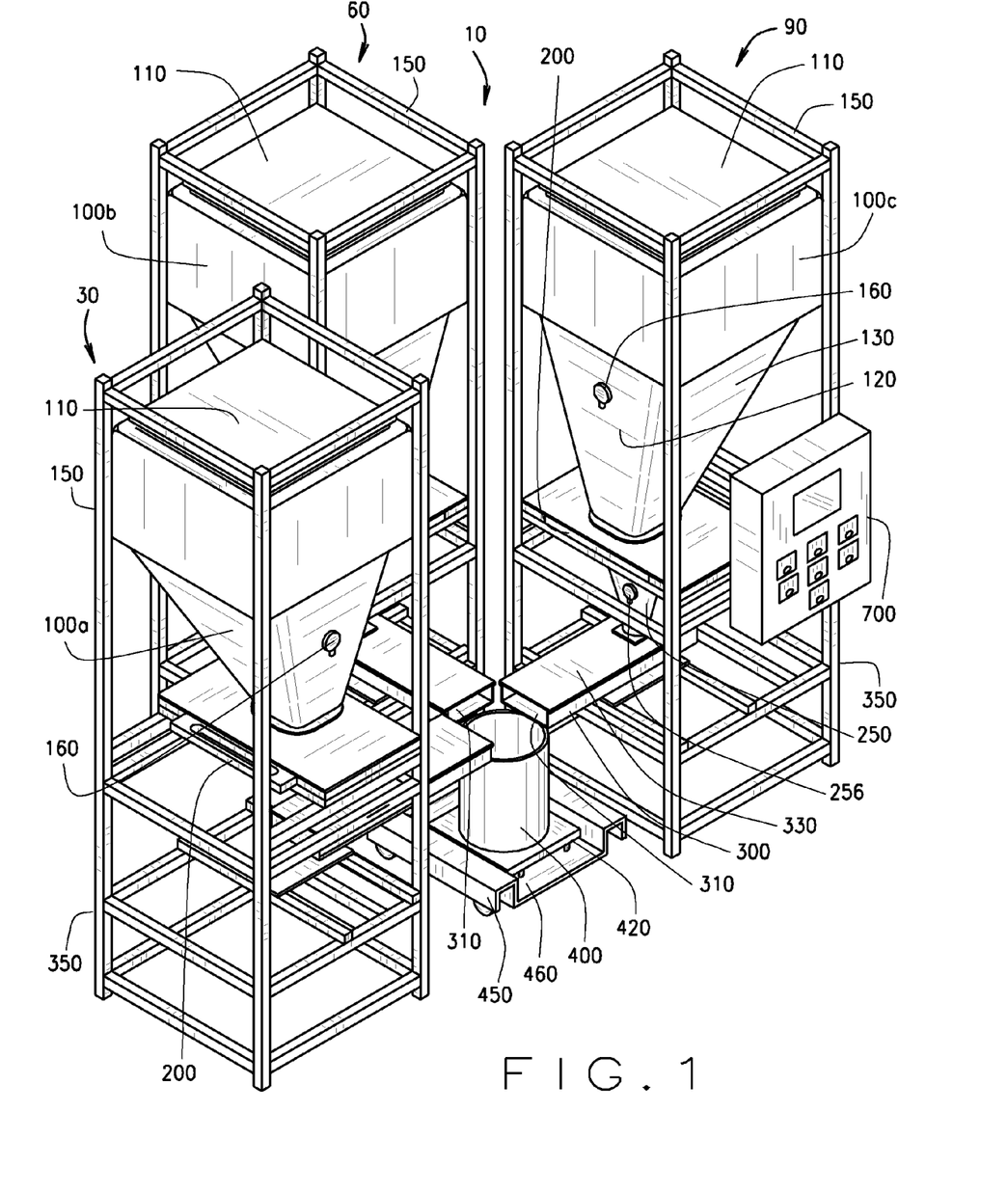
FIG. 1 is a perspective view of the system.
Figure 2:
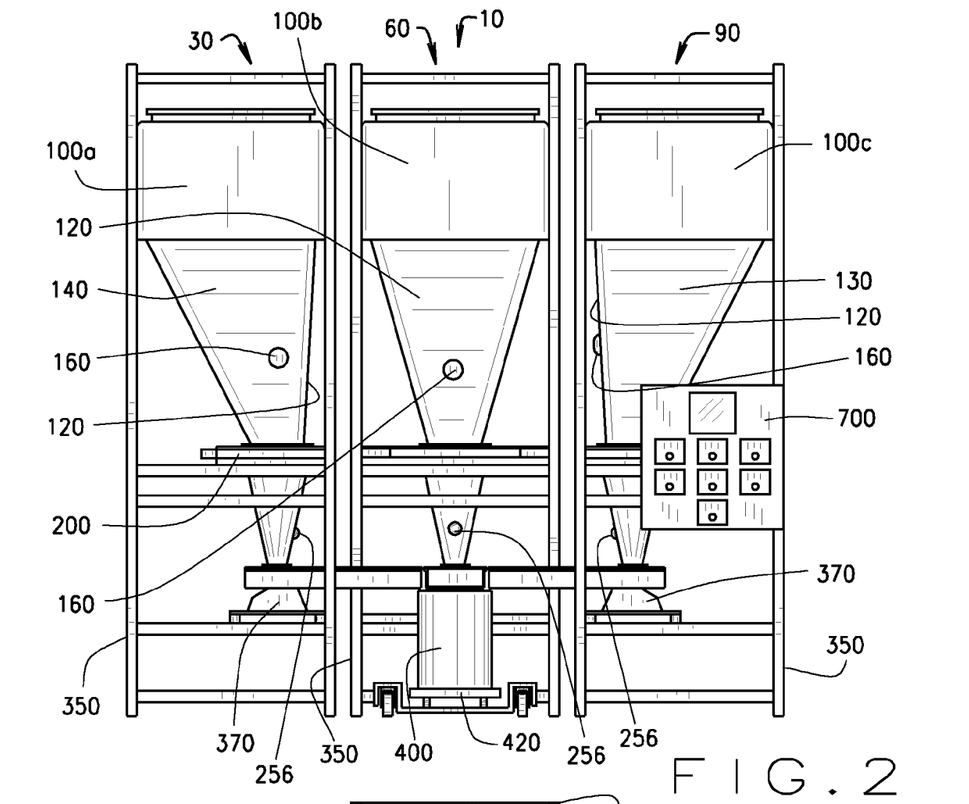
FIG. 2 is a side view of the system.
Figure 3:
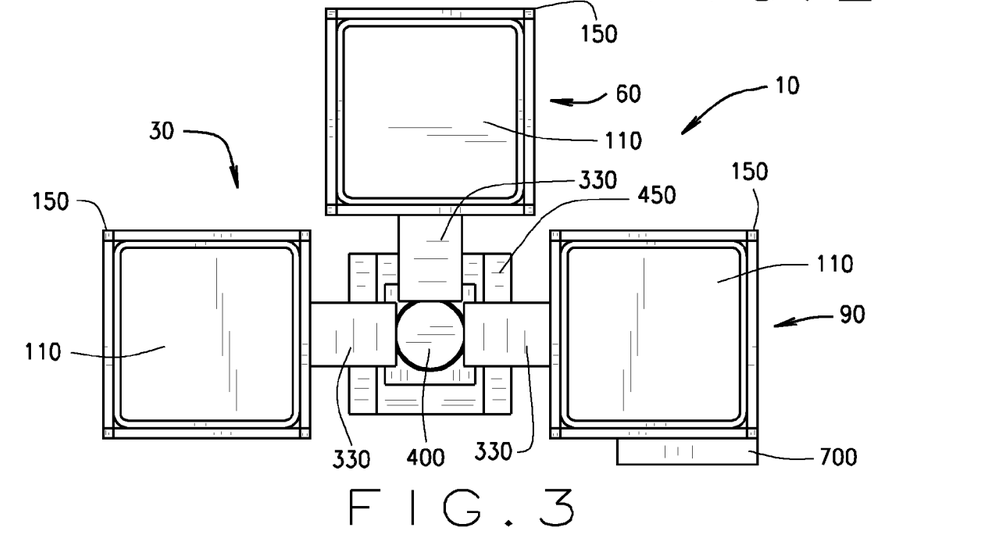
FIG. 3 is a top down view of the system.
Figure 4:
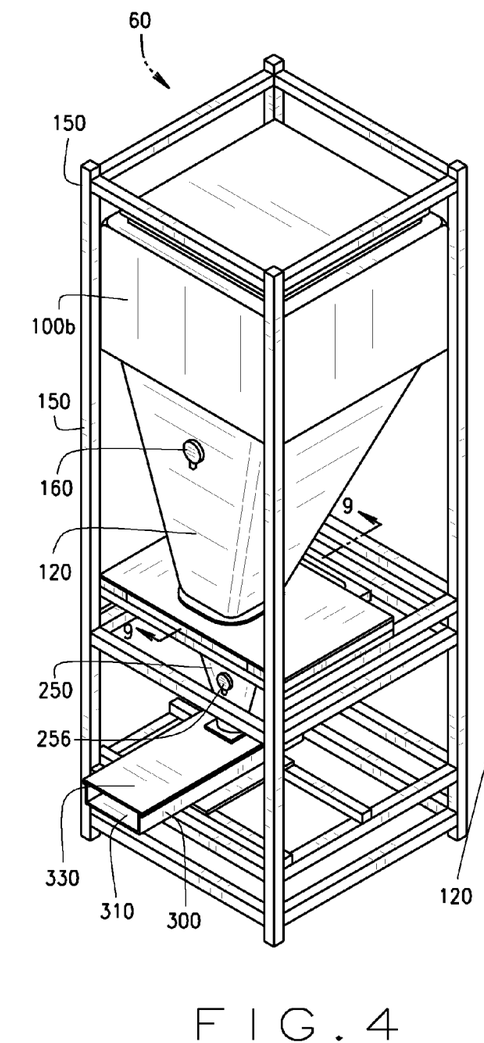
FIG. 4 is a perspective view of the black unit.

The system 10 generally comprises three units, i.e. a yellow pigment unit 30, a black pigment unit 60, and a red pigment unit 90. Each of the units 30, 60, 90 dispenses a particular pigment into a receptacle 400.

Each of the units 30, 60, 90 includes a tote 100 for storing one color of pigment, i.e., the black, yellow or red pigment, such that a tote 100a contains yellow pigment, a tote 100b contains black pigment, and a tote 100c contains red pigment. The totes 100 act as a reservoir for storing the respective pigment until the desired amount of the pigment is dispensed into the receptacle 400.

The totes 100 are each suspended by a tote frame 150. The totes 100 are made from a hard plastic material. The totes 100 may be thermoformed and molded through conventional processes. The totes 100 are generally hollow. The construction of the totes 100 promotes the flow of pigments from the totes 100.

Figure 5:
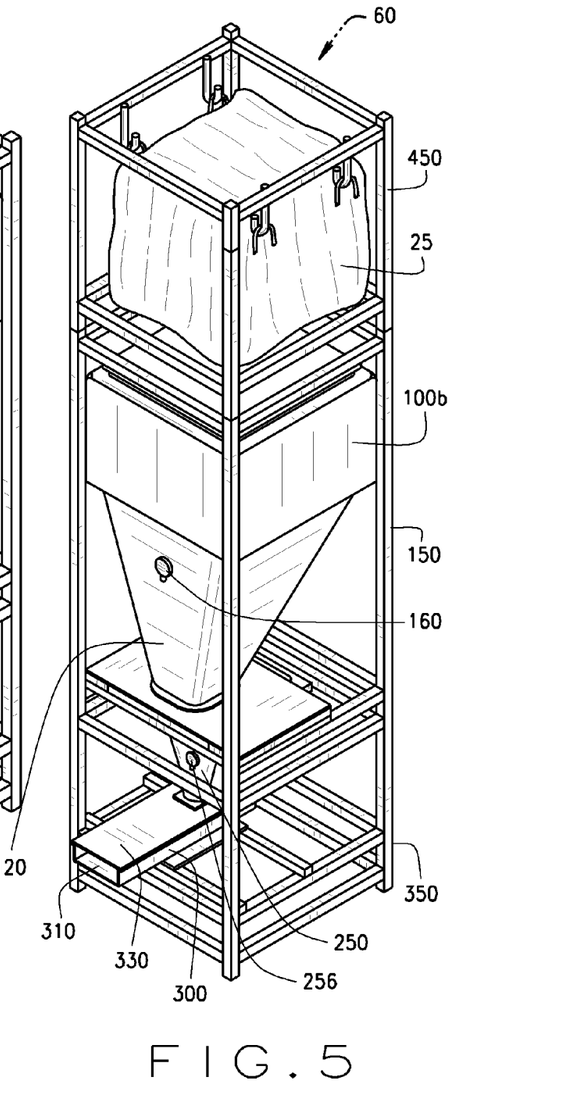
FIG. 5 is a perspective view of the black unit with the bag handler frame positioned for filling the tote.
Figure 7:
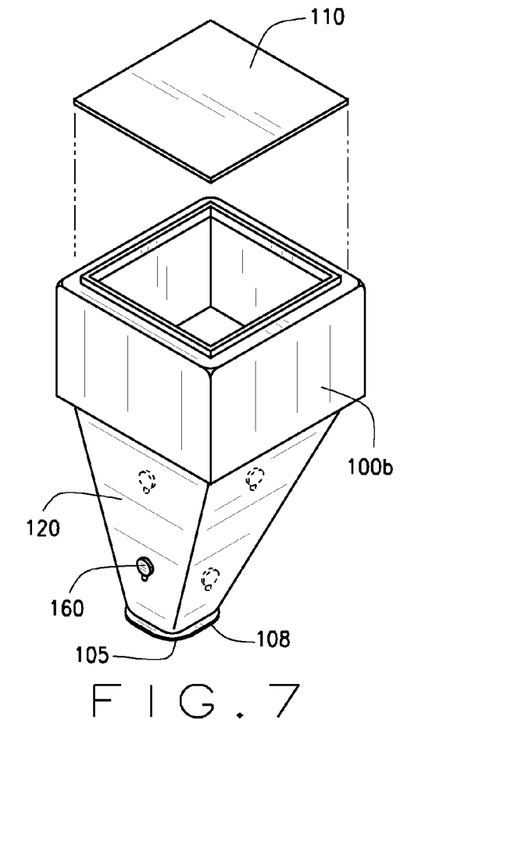
FIG. 7 is view of the tote and tote lid.
Figure 8:
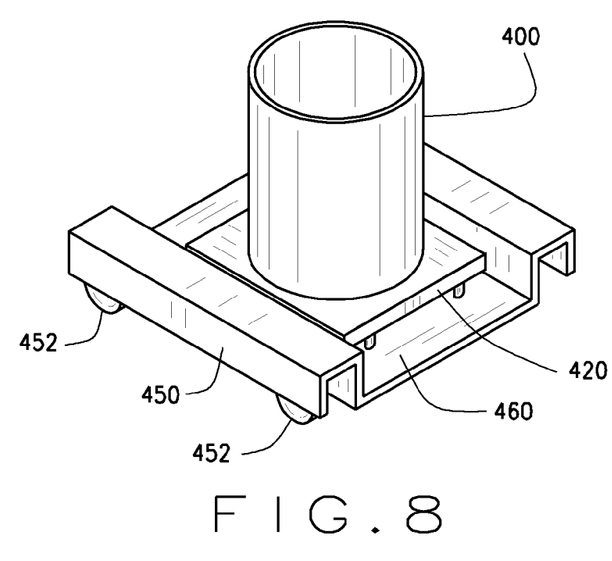
FIG. 8 is a perspective view of the receptacle.

As shown in FIG. 5, the tote 100 may be filled with pigments from bags 25 of pigment that are positioned above the tote 100. As shown in FIG. 7, the tote 100 is provided with a lid 110. Each tote 100 holds up to approximately 2000 pounds of colorant, although the dimensions and capacity of the tote 100 may be scaled up or down depending upon the application.

Figure 6:
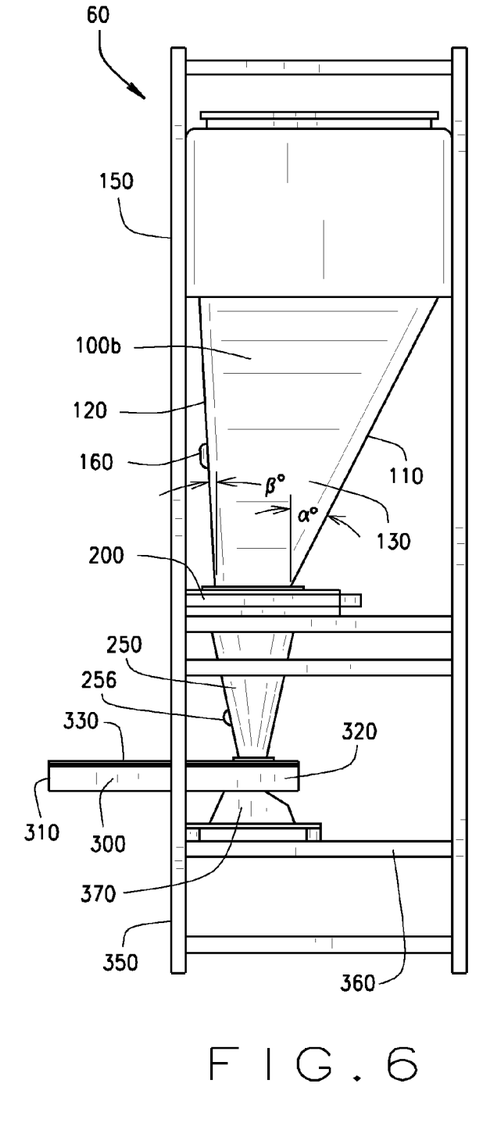
FIG. 6 is a side view of the of the black unit.

As shown in FIG. 6, the black pigment unit 60 includes the tote 100b for the black pigment. The tote 100b includes a first angled side 110 having a large angle and a second angled side 120 having a small angle. The large angle is approximately 20° to 40°, and more preferably, approximately 26° to 32°, and the large angle is shown as angle α° in FIG. 6. The small angle is approximately 1° to 8°, and more preferably, approximately 2° to 4°, and the small angle is shown as angle β° in FIG. 6. The tote 100b is generally similar or identical in construction to the totes 100a and 100c, except, as more fully described below, placement of vibrators 160 on the totes 100 may vary.

Figure 9:
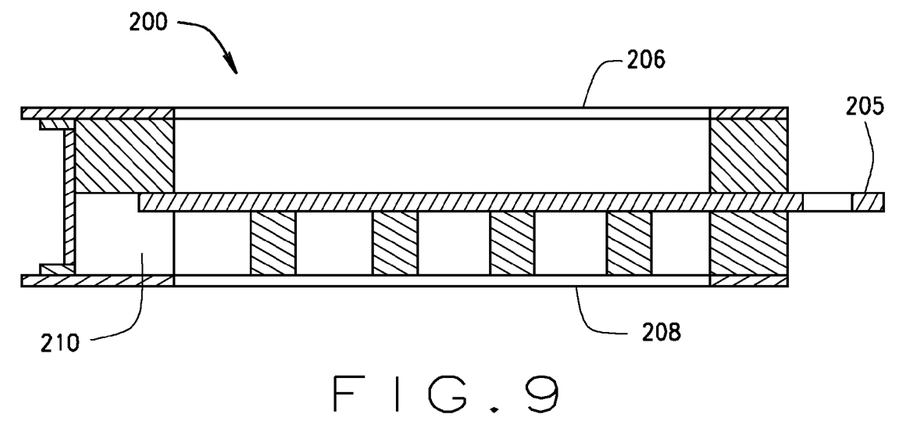
FIG. 9 is a sectional view of the slider valve.
Figure 10:
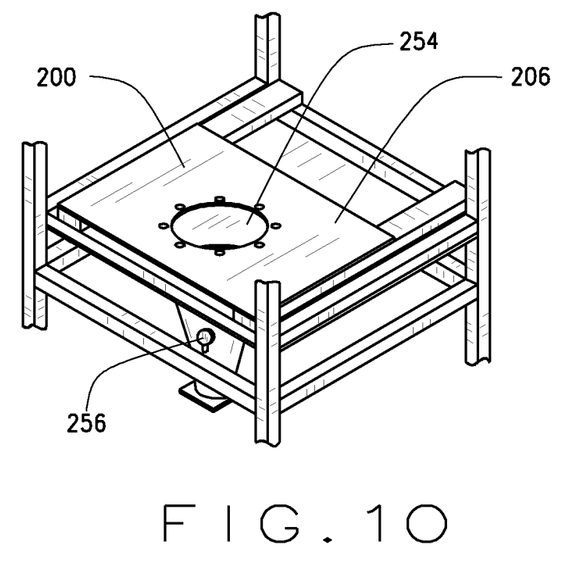
FIG. 10 is a top perspective view of the transition piece.
Figure 11:
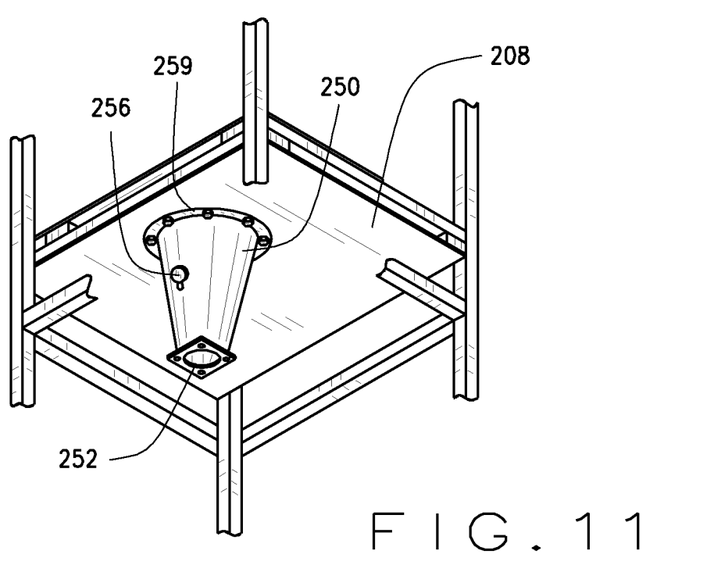
FIG. 11 is a bottom perspective view of the transition piece.

The first and second angled sides 110 and 120 promote the flow of the pigment to a slider valve 200 positioned beneath the tote 100 that restricts flow of the pigment from the tote 100. The slider valve 200 may also be fully closed using a handle 205 to allow removal of the tote 100 from the system 10 without spillage. The tote 100 may require periodic cleaning to remove any built up residue or may require cleaning in the event that a different color is to be placed into the tote 100. The handle 205 of the slider valve 200 may also be opened or closed to act as a coarse adjustment for the pigment exiting from the tote 100. The slider valve 200 may also be fully closed while pigment is present in the slider valve 200. As shown in FIG. 9, the slider valve 200 includes a clean out region 210 to catch pigments when the handle 205 of the slider valve 200 is urged to a closed position.

The slider valve 200 is in open communication with a transition piece 250 that directs the pigment onto a vibratory tray 300. The transition piece 250 acts as a junction to fluidly join the tote 100 and the vibratory tray 300. The vibratory tray 300 pulls the pigment from an opening 252 of the transition piece 250 due to its vibrating nature. Each of the three units 30, 60, 90 operates in a similar manner, namely the vibratory tray 300 pulls the pigments from the opening 252 of the transition piece 250. Each vibratory tray 300 includes an exit opening 310 for dispensing the pigment.

Vibrators 160 and 256 improve the flow of pigment through and from the system 10. The vibrators 256 are positioned on the transition piece 250. Preferably, the vibrators 256 are placed on a front wall of the transition piece 250 facing the receptacle 400. The vibrators 256 improve the flow of the pigments through the transition piece 250.

The vibrators 160 are placed on the totes 100. The vibrators 160 are positioned on at least one of the walls of each of the totes 100. For optimum operation, the placement of the vibrators 160 is configured for the contents of each tote 100. In the system 10, the vibrators 160 are placed on a first sidewall 130 and a second sidewall 140 of the tote 100a containing yellow pigment. In FIG. 2, the vibrator 160 is shown on the second sidewall 140 of the tote 100a and the vibrator 160 on the first sidewall 130 is hidden. The vibrator 160 is placed on the front wall 120 of the totes 100b and 100c containing the black pigment and the red pigment. FIG. 7 shows some of the options for placement of the vibrators 160 on the totes 100. In FIG. 7, the tote 100b for the black pigment is shown with the vibrator 160 on the front wall 120.

The first and second angled sides 110 and 120 and the use of the vibrators 160 and 256 provide for the product to flow through the system 10 without forming a bridge of material in the totes 100, which may clog and cause delays in production. These features provide reliability and accuracy for the system 10.

A control unit 700 for the system 10 is in electrical communication with vibratory feeder motors 370. The control unit 700 turns on a first vibratory feeder motor 370 to start vibrating the vibratory trays 300 and dispensing pigment from a first tote 100 into the receptacle 400 or other receiving container. The control unit 700 calculates the amount of colorant to be added to the receptacle 400 by weight. The control unit 700 contains formulas for the weight of each pigment needed for a specific color of the colorant that is selected by the user.

The receptacle 400 rests on a scale 420. The scale 420 is also in electrical communication with the control unit 700 and provides the control unit 700 with constant weight measurements of the amount pigment added to the receptacle 400. As soon as the desired amount of pigment from the first tote 100 is introduced into the receptacle 400, the control unit 700 shuts off the first vibratory feeder motor 370 and then turns on a second vibratory feeder motor 370. Likewise, when the weight measurement of the pigment from the second tote 100 reaches the formula weight, the second vibratory feeder motor 370 shuts off and a third vibratory feeder 370 is started.

The receptacle 400 receives the batch of colorant from the one or more totes 100. The receptacle 400 may include a plastic bucket, box, bag, plastic-lined box, sealable container, etc. A typical five gallon plastic bucket with a pivoting handle is often used with the system due to it convenience and economical nature. The bucket may be lined with a plastic bag or sealed with a lid. The system 10 may print an adhesive label to identify the batch for applying to the bucket The control unit 700 for the system 10 optionally operates each of the vibratory feeder motors 370 in a variable manner, i.e., as the amount of pigment in the receptacle 400 approaches the target level or target amount of pigment, the control unit 700 reduces the vibration of the vibratory feeder motors 370 in order provide for better accuracy. The control unit 700 may comprise modes for the variable operation. For example, the control unit 700 may comprise a first, high-speed mode (operating the vibratory feeder motor 370 at 100%, a second, medium speed mode (operating the vibrator feeder motor 370 at approximately 60% to 70%) and a third, low speed mode (operating the vibratory feeder motor 370 at approximately 20% to 30%).

The vibratory feeder motor 370 may first be operated at the high speed until the weight of pigment added to receptacle 400 reaches a first predetermined level. Then, the vibratory feeder motor 370 may be operated at the medium speed until the amount of pigment added to the receptacle 400 reaches a second predetermined level. Finally, the vibratory feeder motor 370 may be operated at the low speed until the amount of pigment added to the receptacle 400 reaches its final target level. This improves accuracy as the low and medium speeds transfer pigment to the receptacle 400 at a lower rate, which improves accuracy. For example, the vibratory feeder 370 may be operated at the high speed for the first 70% of the total amount of pigment by weight, at the medium speed for the next 20% of the total amount of pigment by weight, and at the low speed for the final 10% of the total amount of pigment by weight.

Suitable vibratory feeders motors 370 are commercially available from Erize. Suitable models are the HD46C and 35C. These vibratory feeders motors include dual magnets that operate by switching polarity between the dual magnets at specific frequencies.

The vibratory trays 300 are generally made of a stainless steel material. The vibratory trays 300 generally have an elongated, rectangular shape. Sidewalls extend a bottom of the vibratory trays 300. The vibratory trays 300 comprise an entry opening 320 under the transition piece 250 and the exit opening 310 over the receptacle 400. The vibratory trays 300 are positioned such that the exit opening 310 is spaced above the receptacle 400 and is not resting on the receptacle 400. Plastic materials may be used to line the vibratory trays 300 in order to reduce friction between the pigment and the bottom of the vibratory tray 300. Placing TEFLON tape or the like on the vibratory trays 300 promotes the transfer of the colorant over the vibratory tray 300. A preferred tape is an ultra high molecular weight polyethylene tape.

The vibratory trays 300 preferably have a removable cover 330. The cover 330 assists in reducing dust from the pigment in the tray 300 as the pigment is moved by the vibrations of the vibratory trays 300. The cover 330 should be periodically removed by the operator in order to clean the vibratory tray 300 of any build-up of colorant.

The vibrators 160 are placed on the totes 100 to provide movement to the pigment in the tote 100. Suitable vibrators 160 are commercially available from VIBCO as model BB6-130. The vibrators 160 may include an air vibration unit and are generally positioned on the side wall 130, 140 and/or front wall 120 of the tote 100 and reduces the likelihood of the pigment sticking to the sidewalls 130, 140 and/or front wall 120 of the tote 100 and reduces clumping and bridging of the pigments. The angle of the first sidewall 130 and the second sidewall 140 of the tote 100 work in conjunction with the angles of the walls of the transition piece 250 and the vibrators 160 and 256 to promote the flow of the pigment from the tote 100. The vibrators 160 and 256 may be in communication with a plant air supply.

The dispensing of the pigments will now be described. The vibratory trays 300 are serially operated to dispense pigment from one tote 100 at a time. This provides for the control unit 700 to measure the amount of pigment from each tote 100 added to the receptacle 400. The amount of pigment added to the receptacle 400 is based on the measured weight of the pigment. For example, a first pigment is added to the receptacle 400 under the monitoring of the control unit 700 via the scale 420. The first pigment is added to the receptacle 400 from the tote 100a until its weight reaches the specified weight for that particular pigment for the particular color selected. Next, a second pigment is added to the receptacle 400 from the tote 100b on top of the first pigment under the monitoring of the control unit via the sale 420. The second pigment is added until its weight reaches the specified weight for that particular pigment for the particular color selected. Then, a third pigment is added to the receptacle 400 from the tote 100c on top of the first and second pigments under the monitoring of the control unit via the sale 420. The third pigment is added until its weight reaches the specified weight for that particular pigment for the particular color selected. Each of the first, second, and third pigments are added in turn, i.e., serially, to the receptacle 400 in the variable manner, i.e., each pigment is added at several different speeds, described above.

The vibratory trays 300 are in an operational engagement with the vibratory feeder motors 370 to vibrate the trays 300. The vibratory feeder motors 370 are fastened to the feeder frame 350. The vibratory feeder motors 370 may be operated at different rates depending upon the particular pigment in the tote 100. For examples, the vibratory feeder motor 370 for the yellow pigment may operate at 30 herz with a 3/16 inch stroke, while the vibratory feeder motor 370 for the black and red pigments may operate at 60 herz with a 1/16 inch stroke.

The receptacle 400 and scale 420 generally rest on a trolley 450. The trolley 450 generally comprises a flat surface 460 to support the scale 420 and the receptacle 400. The trolley 450 also contains movement means 452, such as wheels, casters, tracks, etc., to allow the receptacle 400 to be slid under the exit openings 310 of the three vibrating trays 300. The trolley 450 includes a read-out of the scale measurement.

In other embodiments, the receptacle 400 and the scale 420 are incorporated onto an automated platform which automatically ejects or withdraws from underneath the vibratory trays 300. The automated platform may includes an air cylinder or the like, which is in operational communication with the control unit 700. After the receptacle 400 has been filled with the batch of colorant, then the control unit 700 signals the automated platform. Typical loads of colorant weight approximately 30 pounds to approximately 50 pounds, and the automated platform reduces the manual labor involved with removing the filled receptacles 400 from the system 10.

The operation of the system 10 will now be described. In order to begin processing a batch using the system 10, the operator enters an order by inputting a color, the cement content and the number of batches to be produced of that particular color into the control unit 700 via a graphical user interface, such as a touch screen. The control unit 700 operates using a WINDOWS operating system. The particular color may be selected from a drop-down list on the touch screen. The receptacle 400 is positioned under the exit openings 310 of the three vibratory trays 300. The user presses a "start button" on the control unit 700, and the pigments are dispensed, one pigment at a time. The control unit 700 may also operate on a WINDOWS based personal computer or other programmable logic controller based system.

After the first batch is dispensed by the system 10 into the receptacle 400, the operator removes the receptacle 400 and replaces it with another empty receptacle 400 and again presses the "start button" on the control unit 700. The graphical user interface displays a record of completed batches and continually produces batches until the completed batch equals the total number of batches requested.

During the dispensing, the graphical user interface will also display and update the amounts of each pigment added to the receptacle 400. The control unit 700 may include an emergency stop button to temporarily stop all functions of the system 10 in case of malfunction. A whisker switch may be located beneath the vibratory trays 300 to serve as a fail-safe shut off in the event that the receptacle 400 is not placed on the scale 420 or the receptacle 400 is removed during the batching process.

The control unit 700 will now be described. The control unit 700 includes software that provides for the entering of a product identification number and ticket numbers, as well as customer information. A particular color is selected as well as the cement content of the mortar that the colorant is to be used with. The software will include the available formulas and includes a database storing the ratios of the three colors to add in order to produce the particular colorant formula. For example, a particular color will include a formula of X pounds of red pigment, Y pounds of black pigment, and Z pounds of yellow pigment. An optional printer may print labels identifying the batch of colorant produced by the system 10.

The control unit 700 contains job-stacking software that allows particular jobs to be pre-loaded into the system 10. The users can thus enter and store known job orders allowing the product to be ready for next day's production schedule.

The system 10 includes a modular construction. Each of the three totes 100 are mounted to a tote frame 150. The tote frame 150 forms a box-like frame to support the tote 100. The tote frame 150 is mounted on top of a feeder frame 350. The feeder frame 350 supports the feeder motor 370 and the vibratory tray 300. A bag handler frame 450 is removably mounted on top the tote frame 150.

A typical system 10 comprises three tote frames 150 mounted on top of three feeder frames 350. One bag handler frame 450 may be used for the three tote frames 150. With reference to FIG. 5, the bag handler frame 450 is typically lowered to the ground, where a bag of colorant 25 is hung on the bag handler frame via hooks 455. A fork lift then raises the bag handler frame 450 onto the top of the tote frame 150, such that the bag 25 may be emptied into the tote 100 of the tote frame 150. The one bag handler frame 450 is typically rotated between the three tote frames 150, although each tote frame 150 could include its own bag handler frame 450. As the different totes 100 are usually emptied at different rates, one bag handler frame 450 is generally sufficient. A typical system 10 with the tote frame 150 and the feeder frame 350 is approximately 18 feet to 20 feet in height with an approximately 5 feet by 5 feet diameter. With the bag handler frame 450 positioned on the tote frame 150, the system 10 has a height of approximately 24 feet to 26 feet in height.

The tote 100 is secured in the tote frame 150. A bottom opening 105 of the tote 100 is placed over a top opening 254 of the slider valve 200 in a top surface 206 of the slider valve 200. As such, pigments flow from the tote 100 through the bottom opening 105 and into the top opening 254 of the slider valve 200. With reference to FIG. 7, a flange 108, surrounding the bottom opening 105 of the tote 100, is secured via bolts, screws, etc. to the top surface 206 of the slider valve 200.

From the slider valve 200, the pigments pass into the transition piece 250. The transition piece 250 is mounted on the feeder frame 350 above the vibratory feeder motor 370. A top opening flange 259 of the transition piece 250 is secured to the bottom surface 208 of the slider valve 200. An exit opening 252 of the transition piece 250 permits flow of the pigment from the transition piece 250 to the vibratory tray 300.

The vibratory feeder motor 370 supports the vibratory tray 300. The vibratory feeder motor 370 is mounted on a cross member 360 of the feeder frame 350. It is important that a base of the vibratory feeder motor 370 is firmly secured to the cross member 360 in order for the vibrations of the vibratory feeder motor 370 to be transferred to the vibratory tray 300.

The exit openings 310 of the trays 300 extend beyond the feeder frame 350. As such, the exit openings 300 from the three units 30, 60, and 90 may be positioned over the receptacle 400.

Those skilled in the art will appreciate that variations from the specific embodiments disclosed above are contemplated by the invention. The invention should not be restricted to the above embodiments, but should be measured by the following claims.

What is claimed:

1. A system for producing batches of a dry pigment of metal oxide crystals, comprising:
   a plurality of pigment dispensers, wherein each pigment dispenser comprises a tote, the tote comprises a first wall at an angle of approximately 20 degrees to approximately 40 degrees to a vertical axis and a second wall at an angle of approximately 1 degree to approximately 8 degrees to the vertical axis, a first vibrator positioned on at least one of the first wall or the second wall, the tote in flowing communication with a slider valve, the slider valve in flowing communication with a transition piece, a second vibrator positioned on a wall of the transition piece, and the transition piece in flowing communication with a vibratory tray having an exit opening;

a receptacle to receive pigments from the exit openings of the vibratory trays, wherein the receptacle is movably positioned underneath the exit openings of the vibratory trays, and wherein the receptacle slides or withdraws from underneath the exit openings;

a control unit to serially operate the vibratory trays to dispense the pigment from each tote; and a scale to measure the weight of the pigments in the receptacle, the scale in operational communication with the control unit.

2. The system according to claim 1, where a first pigment dispenser contains black pigment, a second pigment dispenser contains yellow pigment, and a third pigment dispenser contains red pigment.

3. The system according to claim 1, wherein the vibratory trays are operated in a variable manner with the vibration of the vibrating trays reduced as the amount of pigment in the receptacle approaches a target amount.

4. The system according to claim 1, wherein the control unit comprises one or more formulas for a specific color of a mortar colorant.

5. The system according to claim 4, wherein the formulas comprise a specific amount of at least two of black, red, and yellow pigments.

6. The system according to claim 4, wherein the formulas comprise a specific amount of black pigment by weight, a specific amount of red pigment by weight, and a specific amount of yellow pigment by weight.

7. The system according to claim 1, wherein three pigments dispensers include three vibratory trays with the exit openings of the three vibratory trays positioned over an opening of the receptacle.

8. The system according to claim 7, wherein each of the three pigments dispensers are mounted to frames, and the three vibratory trays extend beyond the frames to position the exit openings over the opening of the receptacle.

9. The system according to claim 1, wherein the dry pigments consist of metal oxide crystals.

10. The system according to claim 1, wherein the dry pigments consist of non-granulated, iron oxide crystals.

* * * * *